United States Patent [19]

Church, deceased

[11] 3,867,124

[45] Feb. 18, 1975

[54] WATER SOLUBLE FERTILIZER

[76] Inventor: John W. Church, deceased, late of 292 Fern Palm Rd., Boca Raton, Fla. 33432 First Bank and Trust Company of Boco Raton and Dorothy M. Church, co-executors

[22] Filed: Oct. 26, 1970

[21] Appl. No.: 84,148

[52] U.S. Cl............................ 71/1, 71/28, 71/30, 71/59, 71/60, 71/64 E, 423/396
[51] Int. Cl................................................ C05c 9/00
[58] Field of Search............. 71/1, 28, 30, 64 E, 59, 71/60, 50; 23/103; 423/396

[56] References Cited
UNITED STATES PATENTS

| | | | |
|---|---|---|---|
| 1,966,947 | 7/1934 | Eyer et al. | 71/60 X |
| 2,030,583 | 2/1936 | Hass et al. | 71/64 E |
| 2,943,928 | 7/1960 | Guth | 71/64 E |
| 3,018,164 | 1/1962 | Guth | 23/103 |
| 3,070,435 | 12/1962 | Reussen et al. | 71/64 E |
| 3,148,945 | 9/1964 | Griffith et al. | 23/103 |
| 3,148,949 | 9/1964 | Griffith | 23/103 |
| 3,325,276 | 6/1967 | Feller et al. | 71/64 E |
| 3,423,199 | 1/1969 | Philen et al. | 71/1 |
| 3,560,192 | 2/1971 | DeCicco | 71/1 |
| 3,617,239 | 11/1971 | Klanica et al. | 71/28 |

Primary Examiner—Samih N. Zaharna
Assistant Examiner—Richard Barnes
Attorney, Agent, or Firm—Oltman and Flynn

[57] ABSTRACT

Granular, water soluble fertilizer having particles of ammonium nitrate, or ammonium nitrate and potassium nitrate, coated with the reaction product of urea and one or more of the following water soluble mineral element: ferrous sulfate ($FeSO_4.7H_2O$), magnesium sulfate ($MgSO_4.7H_2O$), and copper sulfate ($CuSO_4.5H_2O$).

7 Claims, No Drawings

WATER SOLUBLE FERTILIZER

This invention relates to a granular and water-soluble fertilizer.

A principal disadvantage of present water-soluble fertilizers intended for use on grass is their tendency to wash away from the turf too readily, so that during a rainy season their fertilizing effect is comparatively short-lived. The present fertilizer overcomes this disadvantage by providing a longer-lasting fertilizing action in combination with water solubility which enables it to be sprayed onto the grass readily and conveniently.

Another advantageous characteristic of the present fertilizer is that on St. Augustine grass, in particular, it minimizes the usual tendency of this grass to produce a heavy thatch and so-called "runners" which make the grass difficult to mow and detract from its appearance.

The present invention also is directed to providing a granular, water soluble fertilizer whose different constituents are effectively dispersed so as not to become segregated either during the processing of the fertilizer or after it is packaged.

It is a principal object of this invention to provide a novel and improved granular, water-soluble fertilizer for lawns, and particularly for St. Augustine grass.

Another principal object of this invention is to provide a novel and improved fertilizer with predictable characteristics and which is substantially free of segregation of its constituents.

Further objects and advantages of this invention will be apparent from the following detailed description of certain presently preferred examples.

As a first example of the present invention, ammonium nitrate, ferrous sulfate and urea (all of commercial grade purity) are mixed in a predetermined sequence in the proportions by weight of 90 percent ammonium nitrate and equal 5 percent amounts ferrous sulfate and urea. The ammonium nitrate has at least 33.5 percent nitrogen by weight. The ferrous sulfate has at least 28 percent $Fe_2O_3$ equivalent by weight. It includes water of crystallization and traces of impurities commonly found in the principal source of commercially available ferrous sulfate, which is the pickle liquor occuring in the acid pickling of steel. As stated in "Lange's Handbook of Chemistry," revised 10th edition (1967), published by McGraw-Hill, the formula for commercial grade ferrous sulfate (copperas) is $FeSO_4 \cdot 7H_2O$. The urea has at least 45 percent nitrogen by weight.

The mixing may be done as a batch process in a conventional concrete mixer, for example, or as a continuous process in a series of ribbon mixers.

In either type of mixing process the ammonium nitrate is put into the mixer first and then the urea is put in. The two are dry-mixed long enough to produce a substantially uniform dispersion of the urea particles among the particles of ammonium nitrate. In one practical embodiment, five minutes of such mixing has proved sufficient for this purpose.

Following this, ferrous sulfate is mixed in with the dry mixture of ammonium nitrate and uniformly dispersed urea particles. The mixing is continued for an additional 5 or 10 minutes. The urea and ferrous sulfate particles react with each other to produce a slurry-like, semi-liquid mixture which becomes coated onto the ammonium nitrate particles, so that the final product has prills or pellets of ammonium nitrate, with an average size of about 1/16 inch to 3/32 inch in diameter, coated with the reaction product of urea and ferrous sulfate.

Not all of the urea and ferrous sulfate may go into the coating, in which event the granular product may include undissolved urea particles and/or ferrous sulfate particles, in addition to the coated prills of ammonium nitrate.

The entire mixing operation is carried on under closely controlled humidity, preferably not higher than 60 percent relative humidity.

The just-described sequence of steps has been found to be critically important to the proper preparation of the present fertilizer. If the mixing sequence were reversed by first mixing in ferrous sulfate with ammonium nitrate and later adding the urea, it would be virtually impossible to obtain a thorough and uniform distribution of the ferrous sulfate crystals throughout the ammonium nitrate. Instead, marked segregation of the ferrous sulfate from the ammonium nitrate would occur, and the later-added urea would react with the segregated ferrous sulfate particles to produce a liquid slurry that would not disperse readily onto the ammonium nitrate prills.

However, by following the recommended sequence of mixing steps, a highly effective, relatively uniform distribution of the constituents of the fertilizer is obtained by virtue of the coating of the ammonium nitrate prills with the reaction product of urea and ferrous sulfate. The urea makes possible the formation of this coating by reacting with the relatively large amount of water of crystallization in ferrous sulfate.

OTHER MINERAL ELEMENT SALTS

In place of, or preferably in addition to, the ferrous sulfate the present fertilizer may have as an initial ingredient one or more water soluble, sulfur salts of copper, or magnesium, or each having a relatively large amount of water of crystallization for reaction with urea to liquify and produce a coating for the ammonium nitrate prills. These salts should be selected in accordance with the mineral elements needed for the particular soil being fertilized, and it will be understood that these soil requirements may vary from place to place. In general, the sulfate salts of such mineral elements are preferred because of the generally beneficial effect of the sulfate ion on soil, whereas the chloride salts generally should be avoided because of the deleterious effect of the chloride ion. As stated in "Lange's Handbook of Chemistry," supra, the formula for commercial grade magnesium sulfate (Epsom salt) is $MgSO_4 \cdot 7H_2O$, and the formula for commercial grade copper sulfate (blue vitriol) is $CuSO_4 \cdot 5H_2O$.

In the preparation of fertilizer having one or more of such water soluble mineral elements salts, the salt is added after the urea has been thoroughly mixed with the ammonium nitrate for the reasons already stated in the foregoing discussion on ferrous sulfate as the water soluble mineral salt ingredient.

As a result of the sequence of the mixing steps and the reaction of urea with the one or more water soluble mineral element salts, the resulting granular fertilizer has a substantially uniform dispersion of the ingredients so that the product may be sampled by state agriculture inspectors.

In accordance with the present invention, the nitrogen content of the fertilizer may be provided partially by the nitrate of potassium; a mineral element salt which has a drying effect on the mixture may be included.

For example, the fertilizer may have the following ingredients (in percentages by weight):

| | |
|---|---|
| ammonium nitrate | 74% |
| potassium nitrate (KNO₃) | 8.3% |
| urea | 4.1% |
| ferrous sulfate | 4.1% |
| magnesium sulfate | 5.4% |
| manganese sulfate (including water of crystallization) | 4.1% |

In making the fertilizer according to this example, first the potassium nitrate is added to the ammonium nitrate in a mixer and the two are mixed mechanically on the order of 2 minutes to provide a dry mixture consisting of prills of potassium nitrate and of ammonium nitrate dispersed substantially uniformly together. The potassium nitrate is of commercial grade, containing at least 13 percent nitrogen and 44 percent potash ($K_2O$), by weight.

Next, the urea is added and is dry mixed with the potassium nitrate and ammonium nitrate in the same manner as described in the first example given.

Following this, the ferrous sulfate is added to the mixture and then the magnesium sulfate and maganese sulfate are added, after which mixing is continued long enough to produce a substantially uniform dry mixture containing prills of ammonium nitrate and potassium nitrate, both coated with the reaction product of urea and ferrous sulfate and magnesium sulfate, and particles of manganese sulfate dispersed substantially evenly throughout the mixture.

In addition to adding manganese to the soil, the manganese sulfate ingredient has a drying effect on the mixture. This simplifies and improves the dry-mixing itself and the subsequent packaging of the fertilizer, particularly if either is done under humidity in excess of the recommended figure of 60 percent relative humidity as a maximum.

METHOD OF FERTILIZING

Preferably, the fertilizer of the present invention is sprayed on a lawn in a concentration and at a rate effective to prevent its being washed away readily, which is one of the deficiencies of present water soluble lawn fertilizers.

The preferred concentration of the present fertilizer in a water solution is one pound of the dry fertilizer in 4 to 5 gallons of water. This water solution is sprayed on as fast as possible at the rate of 12 or 13 gallons per 1,000 square feet. Preferably, 1,000 square feet are covered in from 4 to 6 minutes.

The ground should be thoroughly watered before the fertilizer solution is sprayed on, but no additional water should be applied to the ground after the fertilizer has been sprayed on.

By following this application procedure, it has been found that the present fertilizer has an exceptionally long-lasting effect despite its water solubility. This advantageous effect may be due to absorption of the fertilizer into the foliage or root structure of the grass, or it may be attributable to tight adsorption of the fertilizer onto the soil particles around the grass. The exact mechanism by which the present fertilizer achieves this long-lasting effect is not completely understood, and the forgoing suggestions as to absorption or adsorption are offered as the most likely hypotheses, based on my present understanding. These suggestions, however, are not to be construed as limiting or defining the scope of my invention.

Another significant practical advantage of the present fertilizer is that on St. Augustine grass it apparently minimizes the development of the usual heavy thatch and runners, which make such grass difficult to mow and detract from its appearance.

I claim:

1. A granular, water soluble fertilizer comprising ammonium nitrate particles with a water soluble coating thereon which comprises the reaction product of urea and one or more of the following water soluble mineral element salts: ferrous sulfate ($FeSO_4 \cdot 7H_2O$), magnesium sulfate ($MgSO_4 \cdot 7H_2O$), and copper sulfate ($CuSO_4 \cdot 5H_2O$).

2. A fertilizer according to claim 1, wherein the weight of ammonium nitrate in the coated particles is several times the weight of the coating.

3. A fertilizer according to claim 2, wherein said ammonium nitrate particles are prills with an average size of about 1/16 to 3/32 inch in diameter.

4. A granular, water soluble fertilizer comprising nitrate salt prills with a water soluble coating thereon which comprises the reaction product of urea and one or more of the following water soluble mineral element salts: ferrous sulfate ($FeSO_4 \cdot 7H_2O$), magnesium sulfate ($MgSO_4 \cdot 7H_2O$), and copper sulfate ($CuSO_4 \cdot 5H_2O$).

5. A fertilizer according to claim 4, wherein said nitrate salt prills comprise ammonium nitrate and potassium nitrate prills mixed together substantially uniformly.

6. A fertilizer according to claim 5, wherein said coating comprises the reaction product of urea and ferrous sulfate and magnesium sulfate.

7. A fertilizer according to claim 6, and further comprising manganese sulfate particles dispersed substantially uniformly among the coated prills of ammonium nitrate and potassium nitrate.

* * * * *